United States Patent Office 3,840,458
Patented Oct. 8, 1974

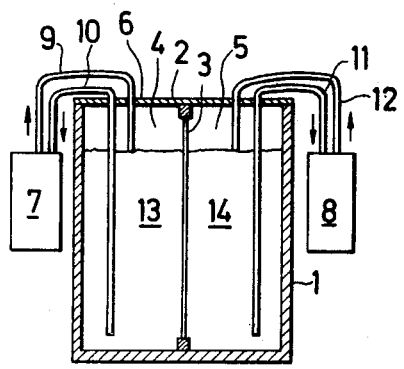
FIG. 1A
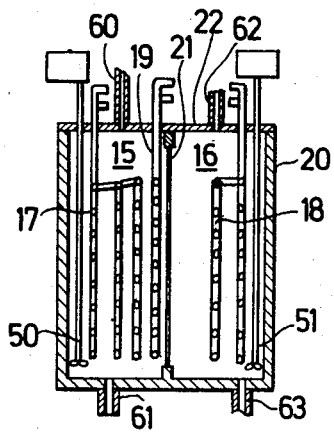
FIG. 2A
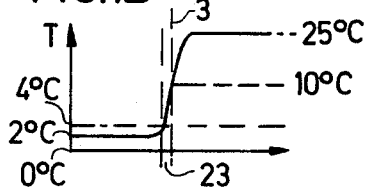
FIG. 1B
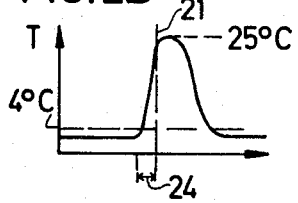
FIG. 2B
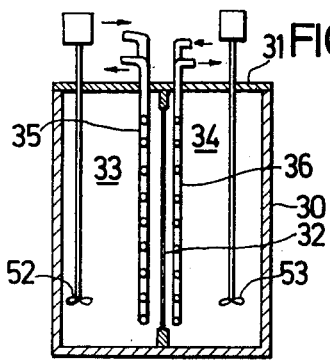
FIG. 3A
FIG. 3B
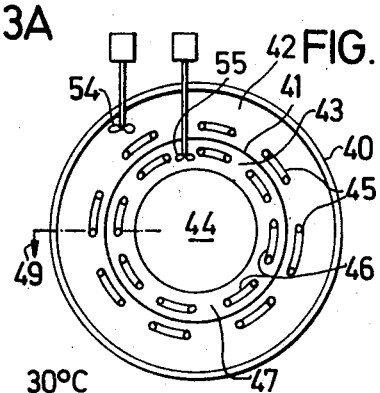
FIG. 4A
FIG. 4B

3,840,458
PROCESS AND APPARATUS FOR OBTAINING THERAPEUTICALLY ACTIVE SUBSTANCES FROM ANIMAL TISSUE
Rolf Deinger, Cologne, Germany, and Paul Buchmann and Monique Beringer, Basel, Switzerland, assignors to Rolf Deininger and Paul Buchmann, Cologne, Germany, and Basel, Switzerland
Filed Sept. 15, 1972, Ser. No. 289,224
Claims priority, application Switzerland, Sept. 24, 1971, 63,953/71
Int. Cl. B01d 13/00
U.S. Cl. 210—22
2 Claims

ABSTRACT OF THE DISCLOSURE

Therapeutically active substances are obtained from a suspension of animal tissue by dialysis, the suspension being kept cooled below +4 degrees Centigrade except for a boundary layer in the immediate vicinity of the dialysis membrane. A dialyzer for carrying out this process and an active substance obtained by this process are also disclosed.

1. FIELD OF THE INVENTION

The invention relates to a process for the dialysis of suspensions of ground embryonic animal tissue and/or placenta tissue or similar liquids which promote bacterial growth and require dialysis, under sterile conditions, o as to obtain therapeutic active substances or similar substances from the suspension, and to a dialyzer for carrying out this process.

2. BACKGROUND OF THE INVENTION

The following designations are used hereafter for the liquids which participate in the dialysis process: the liquid which is subjected to the dialysis is described as "liquid to be dialyzed" and the residue of the liquid to be dialyzed is described as "completely dialysed liquid." These two liquids are present in the so-called dialysis chamber. In the dialyzate chamber, which is separated from the dialysis chamber by the dialysis membrane, the dialysis liquid is introduced and the dialyzate is obtained.

Dialysis processes are as a rule time-consuming and the consequence of this is that those liquids to be dialyzate which are prone to bacterial degradation can suffer intensive bacterial attack unless counter-measures are taken. However, in the isolation of therapeutic active substances and also in other applications, it is desirable to avoid bacterial attack in order to obtain a dialyzate which is as free from bacteria as possible and/or to avoid decomposition of the liquid to be dialyzed, and for this reason sterile treatment is necessary. Bacterial attack can be counteracted by adding preservatives but this in many cases damages the active substances and in some cases the dialyzate is even contaminated still other undesirable side-effects can also occur. To carry out a dialysis without addition of preservatives under sterile conditions requires considerable effort if the customary sterility measures are taken. The object of the invention is to provide a process for carrying out a dialysis of the initially mentioned type even without preservatives and without this effort.

SUMMARY OF THE INVENTION

The invention is characterized in that the liquid to be dialysed is cooled to temperatures of below +4 degrees Centigrade with the exception of the activity boundary layer of the liquid to be dialyzed which immediately adjoins the dialysis membrane, this boundary layer being warmed to higher temperatures than +4 degrees Centigrade. The invention utilizes the fact that below +4 degrees Centigrade bacterial growth is not to be expected to a significant extent. However, at temperatures below +4 degrees Centigrade the speed of dialysis is exceptionally greatly reduced and if it were desired to carry out the dialysis at this low temperature, very long times would have to be tolerated. However, the invention takes this into account through the special temperature increase in the active boundary layer. This is because it has been found that, as far as the Brownian molecular movement is concerned, it only determines the speed of the dialysis in a very narrow boundary layer region, the so-called active boundary layer, and in this active boundary layer the Brownian molecular movement is increased, as a result of the higher temperature used, in the sense of an acceleration of the dialysis. Admittedly, the process according to the invention also requires a cooling effort, but, relative to the dialyzate yield, it is not required in anything like the high degree which would be needed if the active boundary layer were also cooled, because the dialysis according to the invention takes place substantially more rapidly by comparison. Of course, the bacterial growth is then not completely suppressed in this narrow boundary layer region, but since this only concerns a very small proportion by volume of the entire liquid to be dialysed, the bacterial growth is, viewed overall, capable of considerable reduction by the process of the invention, with the dialysis otherwise taking place in the same way. Admittedly, the dialyzate undergoes bacterial attack less than does the liquid to be dialysed, but in many cases sterile handling of the dialyzate is also required. In such a case, the dialyzate can continuously be removed rapidly and then be further treated under sterile conditions, for example sterile-filtered. However, if it is desirable that the dialyzate should also be treated under sterile conditions during the dialysis, a corresponding procedure can also be followed on the dialyzate side by cooling the dialysate to temperatures of below +4 degrees Centigrade, with the exception of the boundary layer immediately adjoining the dialysis membrane.

A slight bacterial growth could under certain circumstances occur in the warmed boundary layer regions, especially if the parts of the liquid which pass into this warmed boundary layer region are not sufficiently rapidly replaced by the dialysis gradient. A further development of the invention, which is based on the objective of also largely suppressing bacterial growth in the boundary layer region, is characterised in that the liquid to be dialyzed and/or the dialysis liquid are constantly circulated or stirred during dialysis so that the parts of the liquid concerned can only briefly remain in the boundary layer warmed to a higher temperature than +4° Centigrade. The boundary layer region is, according to the invention, only a few millimeters wide, preferably 1 to 30 millimeters.

There is thus a temperature gradient in the liquid to be dialyzed instead of on the way to the dialysis membrane. This gradient can be produced by local cooling and local warming of the liquid to be dialyzed. However, it is very much simpler and easy to carry out for many applications if the warming of the active boundary layer of the liquid to be dialyzed is effected by convection heat transfer from the dialyzate. This can most simply be done by cooling the liquid to be dialyzed and warming the dialyzate. In that case, a sudden temperature transition occurs in the boundary region, which, if the starting temperatures are suitably chosen, permits the temperature conditions on the dialysis chamber side which are proposed by the invention.

A further object of the invention is so to design a dialyzer that it is suitable for carrying out the process according to the invention while requiring the simplest possible effort and construction. In this, the invention starts from a dialyzer with a dialysis container in which is provided a semi-permeable dialysis membrane which within the container separates a dialysis chamber from a dialyzate chamber.

A first feature of the invention is characterized in that a circulating device with a cooling apparatus is attached to the dialysis chamber and a circulating device with a heating apparatus is connected to the dialyzate chamber. With this solution, the warming of the active boundary layer of the liquid to be dialyzed, which is required for the dialysis, is effected by heat of convection from the dialyzate. The desired temperatures can thereby be achieved by setting the heating and cooling apparatuses so that these cool appropriately more intensely or less intensely, or heat more intensely or less intensely.

A second feature is characterized in that cooling elements of a cooling apparatus are located in the dialysis chamber and that additionally heating elements of a heating apparatus are located between these and the dialysis membrane. This solution is preferably, namely if sterile treatment is also desirable on the dialyzate side, further developed by accommodating cooling elements of a cooling apparatus in the dialyzate chamber.

A third feature is characterized in that cooling elements of a cooling apparatus are accommodated in the dialysis chamber and heating elements of a heating apparatus are accommodated in the dialyzate chamber. In this solution, as also in the first solution, the active boundary layer is warmed by heat of convection from the dialyzate side. A further development, which permits a particularly steep temperature transition in the region of the membrane, with comparatively little effort, is characterized in that the heating and cooling elements in both chambers are accommodated in the region of the chamber which immediately adjoins the dialysis membrane.

The invention can be realized with dialyzer constructions of a known type of construction provided provision is made that the indicated temperature conditions can be adjusted by heating and cooling. However, an embodiment which is characterized in that the dialysis container is cylindrical and that the dialysis membrane is constructed as a cylindrical surface coaxial thereto is preferred. In this embodiment it is possible to reduce the total volume of the dialysis chamber without making the dialysis membrane smaller, so that the entire volume of the liquid to be dialyzed which is exposed to bacterial attack is restricted from the start, in that the inner chamber is the dialysis chamber and a displacement body is provided centrally within the dialysis chamber.

A further subject of the invention is an active substance which is obtained by the dialysis of a suspension, preferably degraded by trypsin, of ground embryonic spleen tissue and/or of ground nutrient part of placenta tissue, in accordance with the invention, followed by concentration and, preferably, lyophilization of the dialyzate. Such an active substance brings about the highly significant increase in an organ-specific hormone production, in the sense of a rejuvenation.

BRIEF DESCRIPTION OF THE DRAWING

The invention is now explained in more detail with the aid of the attached drawing and of some examples.

In the drawing:

FIG. 1 shows a first embodiment of a dialyzer under A, and, under B, a temperature diagram relating thereto, FIG. 2 shows a second embodiment of a dialyzer under A, and, under B, a temperature diagram relating thereto, FIG. 3 shows a third embodiment of a dialyzer under A, and, under B, a temperature diagram relating thereto and FIG. 4 shows a fourth embodiment of a dialyzer under A, and, under B, a temperature diagram relating thereto.

SPECIFIC DESCRIPTION

In FIG. 1A, 1 marks a dialysis container which is subdivided by a membrane 3, mounted in a frame 2, into two chambers, namely the dialysis chamber 4 and the dialyzate chamber 5, and which can be closed by a lid 6. 7 indicates a circulating and cooling apparatus and 8 a circulating and heating apparatus. The two apparatuses 7 and 8, are connected via pipelines 9 to 12 to the chambers 4 and 5 respectively. In operation, a sterile suspension, for example an aqueous suspension of ground embryonic constituents and/or placenta constituents, is poured, as the liquid 13 which is to be dialyzed, into the dialysis chamber 4, and sterile water 14, as the dialysis liquid, is introduced into the dialyzate chamber, and the container 1 is then closed with the lid 6 under sterile conditions. The liquid to be dialyzed is kept sterile by already being kept at below +4° Centigrade during manufacture. It is poured in after being cooled to below +4° Centigrade and is immediately thereafter kept at temperatures of below +4° Centigrade, for example at temperatures of +2° Centigrade, by the cooling and circulating apparatus 7. The dialysis liquid is warmed by means of the heating and circulating apparatus 8 to +25° Centigrade, so that the temperature course indicated in FIG. 1B results, with a sudden temperature transition in the region of the membrane 3. As can be seen from the FIG. 1B, heat transfer warms a boundary layer region 23 of the liquid to be dialyzed, namely the region of the active boundary layer, to a temperature of up to +10° Centigrade, so that in this active boundary region a high Brownian molecular motion occurs, as is desirable for a rapid dialysis.

According to FIG. 2, 20 indicates a dialysis container, 21 a membrane, 22 a lid, 15 the dialysis chamber and 16 the dialyzate chamber. Cooling elements 17 of a cooling apparatus dip into the dialysis chamber 15 and cooling elements 18 of another cooling apparatus or of the same cooling apparatus dip into the dialyzate chamber. The two cooling elements 17 and 18 cool the liquids to a temperature of below +4° Centigrade. Furthermore, heating elements 19 of a heating apparatus dip into the dialysis chamber 15, but these only extend over the active boundary layer region 24 and are located between the cooling elements 17 on the one side and the membrane 21 on the other. The temperature course achieved in operation with the heating and cooling elements mentioned is indicated in FIG. 2B. According to FIG. 2B, the liquid to be dialyzed and the dialyzate are cooled to temperatures below +4° Centigrade with the exception of a narrow active boundary region on the side of the liquid to be dialyzed and a broader boundary region on the dialyzate side, occasioned by the set-back location of the cooling elements 18. In both boundary regions, the temperature reaches a value of maximally +25° Centigrade. 50 and 51 each denote a stirrer, one for the liquid present in the dialysis chamber 15 and one for the liquid present in the dialyzate chamber 16.

60 represents an inlet pipe which opens into the dialysis chamber 15, 61 an outlet pipe starting from the dialysis chamber 15, 62 an inlet pipe opening into the dialyzate chamber 16 and 63 an outlet pipe starting from the dialyzate chamber 16. These pipes serve to carry out the dialysis by a continuous process in that liquid to be dialysed is constantly supplied through the inlet pipe 60, the completely dialysed liquid is continuously removed through the outlet pipe 61, dialysis liquid is constantly added through the inlet pipe 62 and dialysate is constantly removed through the outlet pipe 63.

In the embodiment shown in FIG. 3, the container is 30, the lid 31, the dialysis membrane 32, the dialysis chamber 33 and the dialyzate chamber 34. 52 and 53 each designate a stirrer, one for the liquid present in the dialysis chamber 33 and one for the liquid present in the dialysate chamber 34. Cooling elements 35 of a cooling apparatus dip into the dialysis chamber and heating elements 36 of a heating apparatus dip into the dialyzate chamber. The cooling and heating elements are only located in the immediate vicinity of the membrane 32 and are operated in such a way that a temperature gradient as indicated in FIG. 3B results. The temperature drop outwards on the dialyzate side and the temperature rise outwards on the dialysis side is occasioned by the surrounding temperature, which is about +18° Centigrade.

While in the embodiments hitherto described the dialysis container 1, 20 or 30 can have a rectangular or circular or other outline, the dialysis container 14, shown in plan view, is in the embodiment shown in FIG. 4 of circular cross-section, and the dialysis membrane 41 is mounted coaxially thereto in the shape of a cylindrical surface so that an outer chamber 42 and an inner chamber 43 result. The outer chamber 42 is the dialyzate chamber and the inner chamber 43 is the dialysis chamber. The volume of the dialysis chamber is limited by a coaxially inserted filling body 44. 54 and 55 each mark a stirrer one for the liquid present in the dialzate chamber and one for the liquid present in the dialysis chamber. 45 marks heating elements of a heating aparatus and 46 cooling elements of a cooling apparatus which analogously to the embodiment according to FIG. 3 are located quite closely along the membrane 41 so that at the height of the arrow 49 a temperature course according to FIG. 4B results, with the temperature of the liquid 47 to be dialyzed, inside the dialysis chamber, being below +4° Centigrade except for a narrow active boundary layer region 48 where it is higher due to heat of convection, being warmed by the dialyzate, the temperature being up to about +15° Centigrade. The dialysis container according to FIG. 4A can also, like the others, be closed.

Instead of the stirrers 50 to 55 or additionally thereto it is possible to provide circulating apparatuses which analogously to the embodiment according to FIG. 1 constantly pump round, or circulate, the liquid in question in a circuit.

The membranes 3, 12, 32 and 41 are semi-permeable dialysis membranes, of which the permeation size, which is of the order of magnitude of molecules or macro-molecules, can be chosen differently from case to case, depending on the dialysis carried out.

All embodiments can be operated either batchwise or in a continuous process. In the embodiments according to FIG. 1A, 3A and 4A, inlet and outlet pipes corresponding to the pipes 60 and 63 from FIG. 2A are additionally provided for the continuous process. Both in batchwise operation and in the continuous process, operation is such that the liquid level of the dialyzate chamber and in the dialysis chamber are the same so that the pressures exerted by these liquids on the membranes mutually compensate.

The invention makes it possible of dialyzate under sterile conditions suspensions which promote bacterial growth, without which it is necessary for this purpose to incur the inherently very high expenditure of customary sterile conditions, in that bacterial growth is prevented in the liquid to be dialysed, which is prone thereto, by cooling to below +4° Centigrade, and in particular doing so in such a way that the speed of dialysis is not significantly reduced thereby. For many end uses these simple sterile conditions suffice and the use of preservatives and other sterilisation measures is superfluous. This is particularly advantageous if suspensions are treated which favor bacterial growth to a high extent, as is particularly the case, for example, in suspensions of ground embryonic constituents and placenta constituents. However, as experience has shown, such suspensions contain active substances which are extremely important for therapy and which can in this way be removed by dialysis of the suspensions, and the fact that in doing so it is possible to manage without preservatives, because of the process according to the invention, makes it possible for the first time to obtain these active substances isolated in their original active form. As clinical tests have shown, these active substances in part lose their activity if they are not treated extremely gently, and when using preservatives or other measures for sterile treatment the requisite gentle treatment cannot, as experience has shown, be ensured with a tolerable amount of effort.

The active substances to be isolated migrate, through dialysis, from the suspension which is introduced into the dialyzer as the liquid to be dialyzed, into the dialysis liquid, for example sterile water, which can then be concentrated for the purpose of intravenous or other administration of the active substances.

EXAMPLE 1

40 liters of pyrogen-free water are cooled to approx. plus 2 degrees Centigrade, 20 kg. of previously comminuted embryonic spleen tissue of sheep are added to this water and the mixture is finely ground to give a colloidally disperse suspension and while doing so is constantly cooled to at least plus 2 degrees Centrigrade.

This suspension cooled to plus 2 degrees Centigrade is poured, as the liquid 13 to be dialyzed, into the dialysis chamber 4 of the dialyzer according to FIG. 1A. 200 liters of pyrogen-free water together with 15 liters of ethanol are filled as the dialyzing liquid into the dialysate chamber 5. The membrane 3 is a semi-permeable cellulose membrane with a permeation size for molecular weights of up to 5,000.

The dialysis chamber 4 has a capacity of 70 liters for the dialyser used, and the dialyzate chamber has a capacity of 250 liters. The liquid levels are at the same height in both chambers 4 and 5 and in each case cover 0.3 square meter of the membrane 3. The feed capacity of the circulating and cooling apparatus 7 is set at 10 liters per hour. The feed capacity of the circulating and heating apparatus 8 is set at 50 liters per hour. The cooling capacity of the circulating and cooling apparatus 7 and the heating capacity of the circulating and heating apparatus 8 is so set that the temperature course indicated in FIG. 1B results, the boundary layer region 23 being 2 cm. wide.

After 72 hours of uninterrupted operation the suspension to be dialyzed is discarded and the contents of the dialysis chamber is removed as dialyzate, sterile-filtered and concentrated to a solids residue of 75 mg./ml. by evaporation in a technical vacuum at +40 degrees Centigrade. The residue is subsequently lyophilized.

The dry residue thus obtained can, for human therapy, be both administered orally as solid or injected as a solution in sterile pyrogen-free water.

Example 2

10 g. of previously comminuted embryonic spleen tissue and 10 kg. of nutrient parts of the placenta tissue of sheep are added to 20 liters of pyrogen-free water and the mixture is finely ground to a particle size of at most 0.5 mm. After addition of 40 gr. of trypsin (20,000 units per gram) the mixture is warmed to +37 degrees Centigrade for 3.5 hours, with constant stirring. To neutralize the aminoacids liberated by the degradation by tryspin, 1.2 liters of triethylamine are consumed. The resulting brown-colored suspension is cooled to plus 2 degrees Centigrade while stirring and is filtered and then further processed as the liquid 13 to be dialyzed, as in Example 1.

Example 3

20 kg. of previously comminuted nutrient parts of the placenta tissue of cows are added to 40 liters of pyrogen-free water and the mixture is finely ground to a particle size of at most 0.5 mm. After adding 40 gr. of trypsin (20,000 units per gram) the mixture is warmed to +37 degrees Centigrade for 3.5 hours, with constant stirring. To neutralize the aminoacids liberated by the degradation by trypsin, 1.2 liters or triethylamine are consumed. The resulting brown-colored suspension is cooled to plus 2 degrees Centigrade with stirring and is filtered and then further processed as the liquid 13 to be dialyzed, as in Example 1.

Therapeutic Action—Example 4

For therapy with the solid residue obtained according to Examples 1, 2 or 3, the dosage for adults is 1 individual dose of 3 mg. administered orally or perlingually 3 times daily, or 2 ampoules each of 3 mg. solids, administered daily. After 30 days' duration of such therapy, the following effects were observed:

Highly significant increase in an organ-specific hormone production in the sense of a rejuvenation. This effect is new and cannot be compared with a hormone substitution such as is otherwise customary. There is a genuine stimulation of the hormone glands. Reduction of blood lipid level protein-anabolic action, increase in the haematocritic value and intensified defense against infection. Highly significant change in the psychic parameters: increase in freshness and vitality, elimination of internal agitation and states of anxiety, improvement of mood, increase in activity and improvement in power of observation.

Example 5

For an external dermatological treatment of skin ulcers (*Ulcus cruris* or *Ulcus decubitalis*), an ointment is prepared from a therapeutically neutral gel suitable for use as a lubricant for rapid percutaneous resorption, into which 5 to 50 mg. (milligram) per 100 gr. (gram) of the solid residue obtained according to Examples 1, 2 or 3 are stirred. 1 to 5 grams of this ointment are applied once daily to an existing skin ulcer. After 3 to 4 weeks' duration of such a treatment, the following effects were observed:

A distinct formation of new granulation tissue and a distinct covering-over of the skin defects. This observation was even also made on skin ulcers treated in this way which were unsuccessfully treated with known agents for months before this treatment.

Example 6

For the external dermatological treatment of ageing facial skin with relaxed skin tone and skin turgor and incipient wrinkle formation, an ointment is prepared from water and therapeutically neutral oil into which 5 to 50 mg., per 100 gr., of solid residue obtained according to Examples 1, 2 or 3 are stirred. 1 to 5 grams of this ointment are rubbed once daily over the whole face. After 3 to 4 weeks' duration of such a treatment, the following effects were observed: a distinct tightening of the skin, improvement of perfusion and increase in skin turgor and skin tone.

We claim:

1. A process for the sterile dialysis of a suspension selected from the group which consists of ground embryonic animal and placental tissue to obtain therapeutically active substances, said process comprising the steps of:
   providing said suspension in the form of a liquid to be dialyzed along one side of a dialysis membrane and disposing a dialysis liquid on the other side thereof;
   effecting dialysis from said liquid to be dialyzed to said dialysis liquor through said membrane;
   cooling said liquid to be dialyzed to a temperature below 4° C. at a location spaced from said membrane whereby said liquid is maintained sterile;
   heating said dialysis liquid; and
   effecting convection heat transfer between said dialysis liquid and said liquid to be dialyzed along said membrane to warm an active boundary layer of said liquid to be dialyzed only directly adjacent said membrane to a temperature above 4° C., said dialysis liquid being heated to a temperature above that of said boundary layer.

2. The process defined in claim 1, further comprising the step of stirring the liquid to be dialyzed.

References Cited
UNITED STATES PATENTS 2,734,015   2/1956   Wettstein et al. _____ 210—22 X
3,203,865   8/1965   Koehler et al. _____ 210—22 X FRANK A. SPEAR, JR., Primary Examiner U.S. Cl. X.R.
210—179, 321

UNITED STATES PATENT OFFICE
CERTIFICATE OF CORRECTION

Patent No. 3,840,458            Dated 8 October 1974

Inventor(s) Rolf DEININGER, Paul BUCHMANN and Monique BERINGER

It is certified that error appears in the above-identified patent and that said Letters Patent are hereby corrected as shown below:

In the heading, line 5, read the first inventor's surname -- DEININGER -- for "DEINGER".

Signed and sealed this 17th day of December 1974.

(SEAL)
Attest:

McCOY M. GIBSON JR.
Attesting Officer

C. MARSHALL DANN
Commissioner of Patents

HD/lw